United States Patent [19]

Cordoba

[11] 3,841,572

[45] Oct. 15, 1974

[54] A DEVICE FOR BREAKING UP COMPRESSED MATERIAL PACKED IN A SACK

[76] Inventor: Gines Gascon Cordoba, Velazquez 157, Madrid, Spain

[22] Filed: Dec. 29, 1972

[21] Appl. No.: 319,704

[30] Foreign Application Priority Data
Aug. 31, 1972 Spain .................................. 183589

[52] U.S. Cl. ............ 241/202, 198/220 BA, 241/284
[51] Int. Cl. ............................................. B02c 19/16
[58] Field of Search ........... 241/201, 202, 217, 219, 241/283, 284, 301; 198/220 BA; 51/7, 17, 163, 313

[56] References Cited
UNITED STATES PATENTS

| | | | |
|---|---|---|---|
| 2,664,675 | 1/1954 | Monica ...................... | 241/284 UX |
| 2,684,148 | 7/1954 | Adams et al. ............ | 198/220 BA X |
| 2,767,826 | 10/1956 | Carrier, Jr. et al. .......... | 198/220 BA |
| 2,993,585 | 7/1961 | Musschoot .................... | 51/163 UX |
| 3,058,576 | 10/1962 | Evans et al. .................. | 198/220 BA |
| 3,195,713 | 7/1965 | Morris et al. ................. | 198/220 BA |
| 3,213,568 | 10/1965 | Setzler ............................ | 51/163 X |
| 3,335,845 | 8/1967 | Wambold ..................... | 198/220 BA |
| 3,465,974 | 9/1969 | Eckert ............................. | 241/284 |

*Primary Examiner*—Granville Y. Custer, Jr.
*Assistant Examiner*—Howard N. Goldberg
*Attorney, Agent, or Firm*—Wenderoth, Lind & Ponack

[57] ABSTRACT

A device for impact breaking up of compressed material packed in a sack includes a frame and means to support a driving and vibrating assembly of the device. A vibrating element or tunnel is inclined and is formed by the joining of two rigid bodies having concave U-shaped cross sections, the respective concavities of the bodies being face to face and having therebetween interchangeable vibration absorbing separators. The upper body has a shorter length and has, at one of its ends, a roller which may turn freely and whose height may be regulated, while the lower body has, on its wide external face, suitable supports for the vibrating assembly. The vibrating and supporting means of the vibrating assembly are elastic bodies arranged in pairs.

6 Claims, 5 Drawing Figures

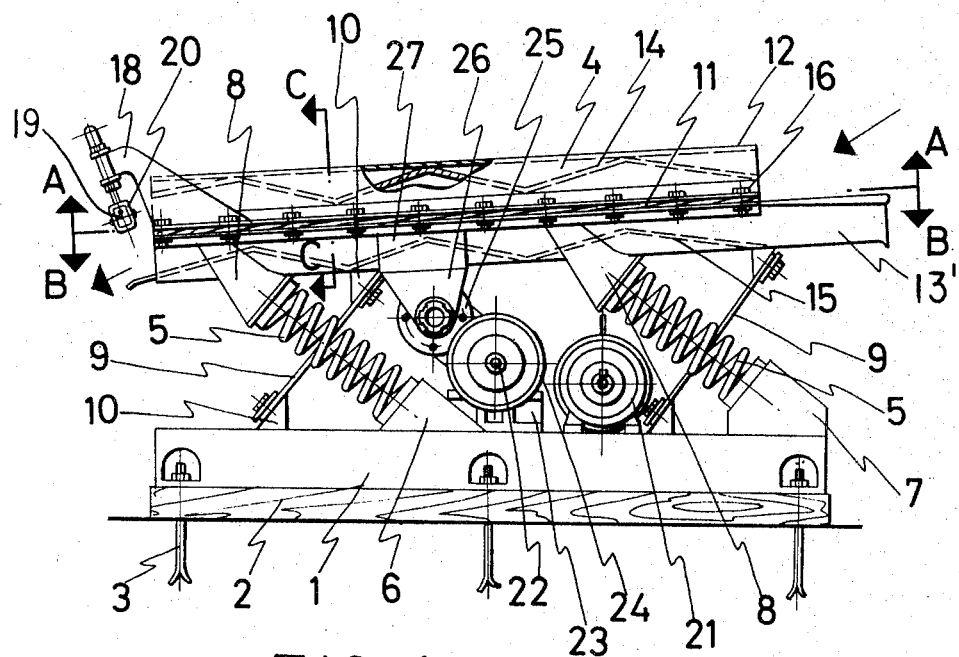
FIG-1
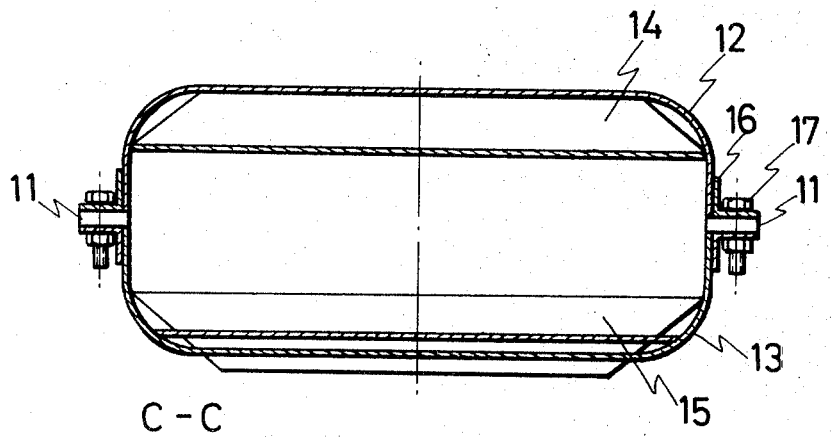
C-C     FIG-5

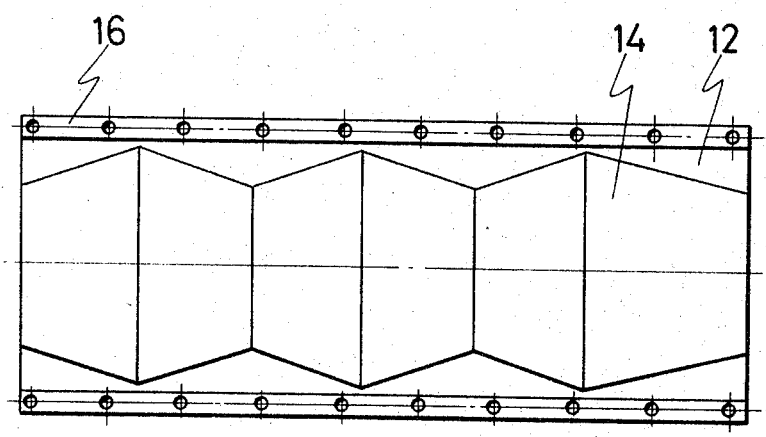
FIG-3   A-A
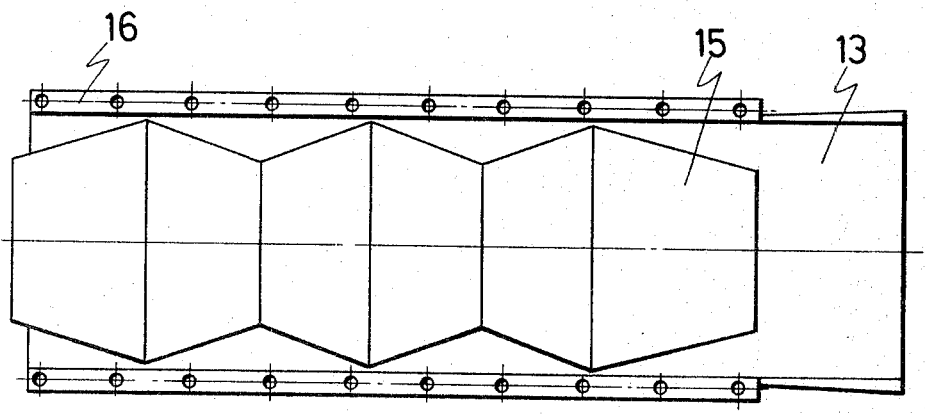
FIG-4   B-B

A DEVICE FOR BREAKING UP COMPRESSED MATERIAL PACKED IN A SACK

BACKGROUND OF THE INVENTION

The present invention relates to a device for breaking, by vibration and impact, lumps in material which is packed or filled into sacks.

Due to pressure and storage time, certain products which are filled in sacks, become compressed, and such compressed condition must be eliminated, i.e., the material must be returned to its normal condition, before such products are used.

The presently used method for breaking up such compressed products is as follows:

Sacks are pounded or beaten, then they are allowed to fall, first on one side and then on the other, from a height between, for instance 1.20 and 1.30 meters. The sacks are then placed on a pallet and the lumps, which may have been left after the previous operations, are beaten intentionally by two workmen using pieces of wood.

A team of four workmen, working only at carrying out such operations, renders a yield of approximately 30 tons in an 8 hour working day.

Besides this very low yield, it is worthwhile mentioning breakage of the sacks which inherently occurs with the use of this method. It should be borne in mind that this loss of sacks, which can be calculated between 35 or 40 percent, causes considerable expense in resacking.

In rare cases, the breakage percent is so high that there is no other economical solution but to break all the sacks and to refill the material in new sacks, in order to avoid the additional expense of hiring extra workers.

It therefore must be apparent that industry is doubtlessly faced with a problem, which has not as yet been solved, as is evident from the use of such a primitive method as described above for performing an absolutely necessary operation.

SUMMARY OF THE INVENTION

In order to overcome the above problem and after long and assiduous studies, a device has been designed in such a way that it totally and efficiently eliminates the above problem with which industry has been faced.

Highly satisfactory results and excellent working conditions were achieved when tests were made with the original of this device.

Breaking up of compressed material packed in sacks is the present device as follows:

When a pallet of sacks of compressed material is placed next to the device, two workmen arrange the sacks on a roller conveyor or carrier which feeds the sacks into the device. Once the sacks have crossed the vibrating tunnel, which forms a fundamental part of the device of the invention, the sacks are perfectly conditioned so that the previously compressed material is broken up due to the intense vibrations to which they have been subjected. After this has been effected, the sacks are deposited on a conveyor belt which is situated in the wagon or truck body at a suitable height so that it can be reached by two other workmen who will duly load the conditioned or treated sacks.

This process renders a yield of 700 sacks per hour, equivalent to approximately 280 tons in an 8 hour working day. The material in the sacks is perfectly broken up and loaded by the same team of four workmen previously mentioned.

The amount of sakcs broken during this process is negligible, and when sack breakage occurs, it is only due to defects in the seams of the sacks.

BRIEF DESCRIPTION OF THE DRAWINGS

In order to amplify the description which will immediately follow and with the purpose of better understanding the features of the present invention, reference will be made to the accompanying drawings wherein:

FIG. 1 is a general front elevational view of the device of the present invention.

FIG. 3 is a plan view of the upper portion of a vibrating tunnel taken along lines A—A of FIG. 1.

FIG. 4 is a plan view of the lower portion of the vibrating tunnel taken along lines B—B of FIG. 1.

Lastly, FIG. 5 is a side sectional view of the vibrating tunnel taken along lines C—C of FIG. 1.

DETAILED DESCRIPTION OF THE INVENTION

Figure 2:
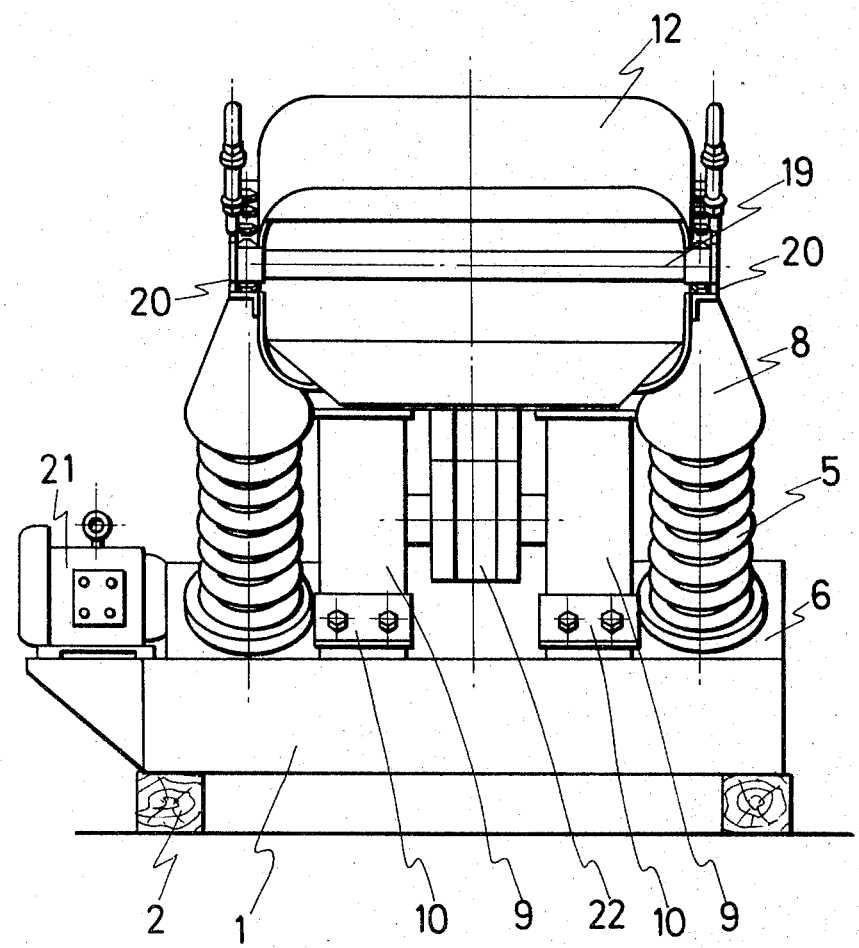
FIG. 2 is a side elevational view of the device seen from the outlet side.

The general structure of the device of the present invention can be appreciated from FIGS. 1 and 2. As can be seen, such device is comprised of a frame 1 constructed of elements having a suitable cross-section. Such frame is covered with a steel plate which supports the entire device and which is fixed to a foundation or footings by means of six bolts 3, with wooden vibration absorbing skids 2 placed between the frame and foundation.

The suspension and vibration systems for the vibrating tunnel or element assembly 4, which comprises the essential part of the device of the invention, are attached to frame 1. The activating or drive system, which is composed of a crankshaft, a piston rod and an electric motor assembly, is also positioned on frame 1.

The suspension system is operative by the action of four recovery springs, which are formed by spiral springs, to level the torque curve, to absorb and return energy due to the weight and kinetic energy of the vibrating tunnel assembly, through each and every vibrating cycle of the assembly.

The arrangement of the four springs in the assembly of the device is controlled by the shape of the spring supports. The lower spring supports are fixed to the frame 1 by means such as welding, while the upper spring supports are joined to the lower part of the vibrating tunnel assembly also by means such as welding.

The lower supports, that is, those situated on the frame, are arranged in identical pairs. The front pair of lower spring supports, situated in the center and on opposite sides of the frame, are each composed of a hollow prismatic element 6, the fact thereof which receives the spring having an inclination of 45° with respect to the horizontal plane. Such face has a small hollow circular lug or projection which houses the tip or end of the spring. Such spring end is held in position by means such as a washer fixed by a screw.

The back pair of lower spring supports which are aligned with the front pair are positioned at one end and on opposite sides of the frame. Similarly, these supports are each comprised of a hollow prismatic element 7 of greater height than the elements 6. The faces of elements 7 which receive the springs also have an inclination of 45° with respect to the horizontal plane and have the same orientation as the faces of elements and incorporate the same type of fastening means for the spring.

The springs 5, which align perpendicularly with the receiving faces of elements 6 and 7, contact the upper spring supports 8 situated in the lower part of the assembly 4. These upper spring supports are comprised of spring holding means having the same features as described with regard to the lower spring supports.

Due to the action of these four springs, arranged as previously described, a perfect suspension of the vibrating tunnel assembly 4 is achieved. Such suspension is slightly inclined downwardly towards the outlet end of the assembly. This inclination is obtained by means of raising the back pair of springs due to the fact that its lower supports are situated at a higher level.

The vibrating system incorporated in this device includes an assembly of four laminated or leaf springs 9 which aid in controlling the amount of vibration of the vibrating tunnel assembly 4.

The front pair of supports is slightly shorter than the back pair, thus the movement of same is a combination of turning and displacement.

The mentioned laminated or leaf springs 9, made for instance of fiber glass, comprise flat elements having a rectangular plan form. The ends of these springs are fixed to supports 10 by means such as set screws.

The arrangement of the laminated or leaf springs, forming part of the vibration system of the device in question, as a whole, is achieved by an inclination which is in an opposite direction to that given to the suspension springs 5, i.e., such that the axes of both systems cross each other perpendicularly.

The vibrating tunnel assembly 4, an essential part of this device, is composed of two steel plated elements separated by two interchangeable wooden separating or vibration absorbing strips 11.

FIG. 5 shows a transversal section of the assembly 4, wherein it can be seen to be made up of two U-shaped tunnel forming members 12 and 13, the central leg of each of which is wide with respect to the end legs thereof. The longitudinal edges of such members are provided with angular profiles 16 with which, by placing therebetween skids 11 and by means of set screws 17, the attachment of members 12 and 13 is obtained.

FIG. 3 represents the upper member or cover 12 having in its interior a plurality of trapezoidal shaped plate pieces 14 placed end-to-end at angles to each other in such a way that they form a wave-shaped element which extends the whole length of cover 12.

The lower member 13, shown in FIG. 4, is longer than member 12, and also has therein a plurality of trapezoidal shaped plate pieces 15 positioned end-to-end at angles to each other in such a way that they form a wave-shaped element, which however does not extend over loading area 13' of lower member 13. The wave-shaped elements form a zig-zag channel extending longitudinally of the vibrating tunnel assembly from the inlet to the outlet.

With reference to FIG. 2, which shows the device seen from the unloading side, it can be observed that a roller 19 is freely rotatably supported by two yokes 20, mounted for vertical adjustment in brackets 18 of the upper member or cover 12.

Finally, vibrations of the device are initiated by the action of an electromotor 21, having for instance a HP of 5.5 and 1,500 revolutions per minute, which by means of trapezoidal pulleys and belts, transmits the energy to a crankshaft 22 supported by two main bearings 23 and provided with inertia wheels 24. A piston rod 25 having ball bearings at the top and bottom is attached to crankshaft 22 and is joined to the vibrating tunnel assembly 4 by means of a support 26 through a reinforcement 27 which is fixed to the lower part of vibrating tunnel assembly 4.

In order to better understand the entire functioning of the device, the operation thereof will now be described.

Once the device is conveniently fixed to a foundation by means of bolts 3 and once the device is in operation, the sacks of compressed material to be treated are inserted onto loading area 13' situated at the right of the device, as indicated by the arrow in FIG. 1.

Due to vibration, produced by the driving elements which are included in this device, the sacks are transported along the tunnel assembly 4, aided by the inclination thereof, towards the discharge end thereof. Due to the fact that the sacks are forced to move through the winding path formed by the plates 14 of the upper member 12 of the tunnel and by the plates 15 of the lower member 13 of the tunnel, simultaneous contact of both faces of the sack with the peaks or points of plates 14 and 15 takes place, and the impact of the vibration is centered in small areas, thus augmenting the effect of the impact.

Roller 19, the purpose of which is to pound and break down any lumps of compressed material which may have remained, is situated at the outlet end of the vibrating tunnel assembly.

With this final operation, breaking up of the compressed material is achieved in a completely satisfactory manner.

It is not considered necessary to further describe the invention, since any person skilled in the art will perfectly understand the object of the invention, as well as the advantages derived from its industrial exploitation.

However, it is to be understood that the scope of the present invention includes modifications of the specific structural features described above with regard to a preferred embodiment.

I claim:

1. A device for breaking up by vibration impact compressed material packed in a sack, said device comprising:

a base mountable on a foundation;

a vibrating tunnel assembly having an inlet and an outlet;

a plurality of supporting means including pairs of coil springs and leaf springs for resiliently supporting said vibrating tunnel assembly above said base in an inclined manner with said outlet lower than said inlet;

vibrating means mounted on said base and connected to said vibrating tunnel assembly for imparting a vibrating motion thereto; and said vibrating tunnel assembly comprising:
- an upper tunnel forming member having a first longitudinal length and a U-shaped concave transverse cross-section;
- a lower tunnel forming member having a second longitudinal length greater than said first longitudinal length and a U-shaped concave transverse cross-section;
- said upper and lower members being joined with the concavities thereof confronting each other;
- a roller freely rotatably positioned adjacent said outlet; and
- means attached to said upper member for mounting said roller.

2. A device as claimed in claim 1, further comprising longitudinal vibration absorbing strips interposed between said upper and lower members.

3. A device as claimed in claim 1, wherein one of the longitudinal ends of each of said upper and lower members being substantially aligned to form said outlet, and the opposite longitudinal end of said lower member extending beyond the opposite longitudinal end of said upper member to form a loading area.

4. A device as claimed in claim 3, wherein said vibrating tunnel assembly further comprises a first plurality of flat plates positioned end-to-end at angles to each other to form a first wave-shaped element extending longitudinally within said upper member, and a second plurality of flat plates positioned end-to-end at angles to each other to form a second wave-shaped element extending longitudinally within said lower member, said first and second wave-shaped elements being spaced from each other to form therebetween a zig-zag shaped channel extending longitudinally of said vibrating tunnel assembly from said inlet to said outlet.

5. A device as claimed in claim 4, wherein said flat plates have a trapezoidal shape.

6. A device as claimed in claim 4, wherein said second wave-shaped element does not extend into said loading area.

* * * * *